(12) United States Patent
Adams et al.

(10) Patent No.: US 8,832,017 B2
(45) Date of Patent: Sep. 9, 2014

(54) SYSTEM AND METHOD TO DEFINE, VALIDATE AND EXTRACT DATA FOR PREDICTIVE MODELS

(76) Inventors: Bruce W. Adams, West Vancouver (CA); Peter R. H. McConnell, Vancouver (CA); Clive Wright, Vancouver (CA)

(*) Notice: Subject to any disclaimer, the term of this patent is extended or adjusted under 35 U.S.C. 154(b) by 539 days.

(21) Appl. No.: 13/097,007

(22) Filed: Apr. 28, 2011

(65) Prior Publication Data

US 2011/0270797 A1     Nov. 3, 2011

Related U.S. Application Data

(60) Provisional application No. 61/330,319, filed on May 1, 2010.

(51) Int. Cl.
*G06N 7/00* (2006.01)
(52) U.S. Cl.
CPC ........................................ *G06N 7/00* (2013.01)
USPC .......................................................... 706/59
(58) Field of Classification Search
USPC .......................................................... 706/59
See application file for complete search history.

(56) References Cited

U.S. PATENT DOCUMENTS

| | | | |
|---|---|---|---|
| 5,453,944 A * | 9/1995 | Baumoel | 703/2 |
| 7,424,823 B2 * | 9/2008 | Teolis et al. | 73/112.01 |
| 2007/0127833 A1 * | 6/2007 | Singh | 382/254 |
| 2007/0299614 A1 * | 12/2007 | Dewarrat | 702/16 |
| 2009/0150124 A1 * | 6/2009 | Wilt et al. | 703/1 |

* cited by examiner

*Primary Examiner* — Kakali Chaki
*Assistant Examiner* — Mai T Tran (57) ABSTRACT

The present invention provides a System and Method to Define, Validate and Extract Data for Predictive Models. A system of sensors is deployed in an environment, with additional sensors for ambient data whose output as a form of metadata can characterize performance conditions including background ambient conditions. A format or sequence of processes is the basis for a math model to establish a logical weight to data for predictive modeling and event reporting. The present invention provides a computer or other sensor interface system with a primary sensor or sensors, network connection, and supplementary sensors to measure the conditions in which the primary data is captured. A software process allows for user inputs of data in order to establish the methods and rules for normal function.

1 Claim, 6 Drawing Sheets

The Relevance Processor and its Inputs

Figure 1. Schematic of System Components

Figure 2. The Relevance Processor and its Inputs

Figure 3. The SSM Sensor Signal Model processor

Installation - Operational Functions :

IFM - adjustment period

SSM - operation

Operational Conditions :

Normalization

Sensor Combinations

Feature Extraction :

- Multi-parameter variations:
  1st order - Certainty
  2nd order - Correlation of System Dynamics

- Probability and distribution functions.

Fig 4. The Deployment Phases of Installation, Operation, and Feature Extraction

Figure 5. Features of the Predictive Model

Figure 6. The notation of an event caused by tampering, the notation created by using orthogonal metadata.

SYSTEM AND METHOD TO DEFINE, VALIDATE AND EXTRACT DATA FOR PREDICTIVE MODELS

CROSS-REFERENCE TO RELATED APPLICATIONS

This application claims benefit under 35 U.S.C. 119(e) to U.S. provisional patent application Ser. No. 61/330,319, filed May 1, 2010, which is incorporated herein by reference in its entirety.

FIELD OF THE INVENTION

The present invention pertains to the field of environmental monitoring and in particular to sensor performance enhancement.

BACKGROUND

Numerous methods to describe state variables have been used describe the "state" of a dynamic system. In simple thermodynamics systems, or mechanical systems, data and their derivatives are typical state variables; knowing these, the future behavior from objects in a system can be projected where the state and history describes enough about a system to determine its future. Sensor systems are subject to numerous conditions that have direct impacts on the state of their usefulness. One variable often used for sensor performance by definition is the Signal to Noise Ratio (SNR). Unfortunately SNR is often used to inappropriately describe sensor accuracy.

Therefore there is a need for better sensor performance, and while there are numerous methods to describe the state of sensor systems, extrapolation of sensor data to be used in a reliable business context remains a challenge.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a System and Method to Define, Validate and Extract Data for Predictive Models. In accordance with an aspect of the present invention, there is provided a system deployed in a sensor environment, with sensors for ambient data whose output as a form of metadata with a reference time code can characterize performance conditions including background ambient conditions.

In accordance with another aspect of the present invention, there is provided a system deployed in a sensor environment, with sensors for ambient data whose output as a form of metadata with a reference time code can characterize performance conditions including background ambient conditions, where a format or sequence of processes is the basis for a math model to establish a logical weight to data, and where multiple sensor variables can be combined to derive such weighting including a data variable model, iterative forward modeling, and a sensor signature model and non rigid patterns and classification of data with a logical process defined relative to the application.

DETAILED DESCRIPTION OF THE INVENTION

Definitions

The term "Anomaly Detection" is used to define data that has provided visibility to potential insider threats, compliance violations and other operational risks. This combined with contextual event forwarding enables real-time identification and alerting of anomalies within application, database and network activity.

The term "Hazard" is used to define a property or situation with the potential to cause harm.

The term "Sensitivity" is used to define the ability to test for a hazard and is the relationship between true positives and false negatives.

The term "Specificity" is used to define the assurance that a test is positive for a certain hazard, and is the relationship between false positives and true negatives.

The term "Event" is used to define the Frequency; Amplitude; Duration; Rate of Change in the calculation of quantitative relationships of the data sources in a matrix type calculation The term "Occurrence" is used to define the Detection, Monitoring and Surveillance for Hazard related events The term "Probability" is used to define the Occurrence of a particular Hazard related Event in a given period of time or as one among a number of possible Events.

The term "Risk" is used to define the probability of the occurrence of a particular hazard; or what can go wrong; how likely it is.

The term "Consequences" is used to define the magnitude of the adverse effects or harm arising to the quality of human health or the environment.

The term "Risk Interpretation" is used to define the combination of Risk and Consequences as Occurring Events The term "Risk Management" is used to define the process of implementing decisions about Risk Interpretation with other Empirical evidence and site specific knowledge; and accepting or altering risks in an iterative process.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

Figure 1:
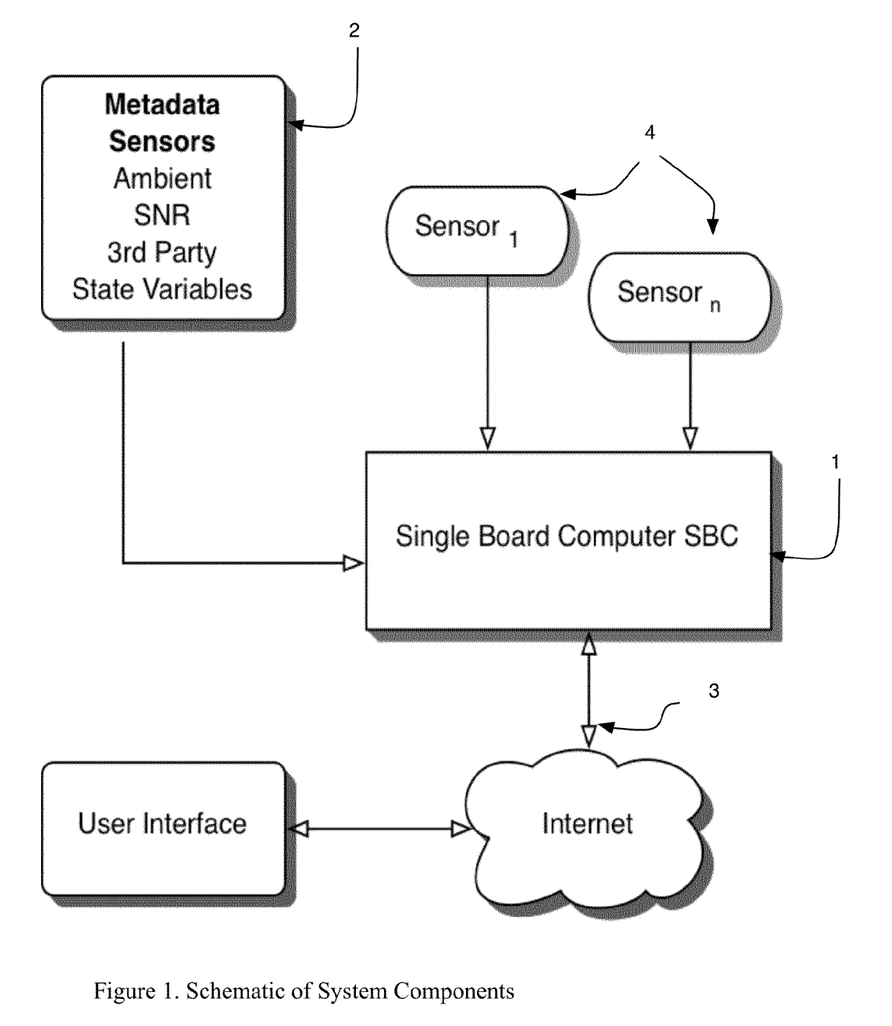
FIG. 1 illustrates a Schematic of System Components

The present invention provides a single board computer 1, or other sensor interface system with a primary sensor or sensors 2, network connection 3, and supplementary sensors 4, to measure the conditions in which the primary data is captured. A software process allows for user inputs of data in order to establish the methods and rules for normal function.

The invention will now be described with reference to specific examples. It will be understood that the following examples are intended to describe embodiments of the invention and are not intended to limit the invention in any way.

Design of a Critical Systems Monitor

The invention is a combination of data mining and specialized hardware in a configuration to allow for rapid detection of sensor systems anomalies. The application of a sensor to measure the ambient conditions of a subject and subsequently whether the subject is at a higher total energy level, can impact the monitored response from a sensor or sensors such that the data might appear differently than its actual purpose should dictate. In some situations, the performance of a system might be tied to its ambient conditions, and so would become ineffective and error prone during changes in those conditions.

The inventions require three aspects to monitoring critical data.

First is the interpretation of what is critical.

Second is validating and securing the data.

Third is the extraction from data of events that can be used to present relevance.

Interpretation of Critical Data
State Variables and Modeling

State variables are used to represent the states of a general system. In an environmental monitoring system it could include continuous measurement of variables such as temperature, vibration, humidity, incident light, time or database entries such as laboratory reports of levels of organic or chemical matter. In a discrete time system the state variable represents the current state of a system $y_n$, where n is the period at which the system is being evaluated.

Indicators Versus Actual Problem

Surrogate indicators of a problem can be used to establish reference data where measurement of the actual data is not practical. For instance humidity and temperature would be indicators of the conditions for biomaterial to survive in a ventilation system.

User defined parameters may also be used to impart data into a process. The incorporation of existing data and knowledge can be made using a priori knowledge of the relationships between events and their affects. For instance, rainfall may be off little risk to a ground water supply unless it is preceded by a dry spell or by agricultural activity such as fertilization. In this manner, third party data, such as environmental data can be incorporated into a database and used in conjunction with the contextual rules by which data is analyzed.

A root cause analysis is only valued when it is put in context. Traditional models might not be able to present useful data if an event is measured without it being in context. A priori knowledge and data can be used to qualify the relationship between absolute variations in data and their relative changes to either state variables or other measures and indicators.

One objective of the present invention is to continuously update a priori data using automated methods. Prioritization of data in multiple spatial dimensions such as with an range finding optical system or biosensor measurement network system can be made by first referencing changes in state variables. Other dynamic variables within the field of view could also be incorporated such and manually input data or sensors not adjacent but within the range of impact of the sensor could also be inclusive. For instance, a range finding system could be sensitive to vibrational patterns; a ventilation system could be better assessed with a temperature and humidity measurement at the intake of the system, which could impact the data that is interpreted further down the system or on the opposite side of a filter mechanism. One objective of the invention is to provide ambient data as a form of metadata with a reference time code. The metadata is used to characterize the conditions of an individual system and to measure the background ambient conditions. This would include SNR conditions, and other data that might contribute to measure the normal pattern of operations and interference, prior to a data capture series. A metadata pattern reference would subsequently be representative as a look up table in a relational database or reference algorithm in a semantic network system. In some cases, sensor function can be verified using vibration frequencies within a mechanical system to assure that the systems are operating normally. This is especially the case where the measurements involve fluid exchange such as holding tanks and boiler systems. Measurement of vibrational frequency response may also be limited by the presence of other mechanical systems and as such multiple accelerometers, which could be used to measure the spatially coordinated patterns at various frequencies. An accelerometer or excitation using an electro-mechanical transducer such as a piezo electric crystal or linear actuator to create the signal pulse could be used depending on the application.

One objective of the present invention is to provide a format for a math model for data analysis where a sequence of processes is used to establish the relevance of data to each specific use case. This requires that there are established normal functions and acceptable variations from a standard. This would include which variations are considered orthogonal such that a change in one data stream is not necessarily dependent or related to the other. Prioritization of those orthogonal relationships has particular relevance to the interpretation of data. In some cases, the orthogonal data may come from the same sensors and include such models as ratio of probability distributions of frequency, amplitude or slope variations from normal. Measurement of ambient conditions such as SNR, temperature and accelerometer data noise in the system are used to validate if changes in orthogonal ratios are subject to conditions that might skew the data to yield false readings. This may further include correlation of noise between sensors, a calculation of the total energy in the system and the ratio between total energy and ambient effects. Conditions in a sensor response that is considered to be relevant to a use case can be compared to similar sensors in the vicinity in a network based model.

Validating and Securing the Data

Figure 2:
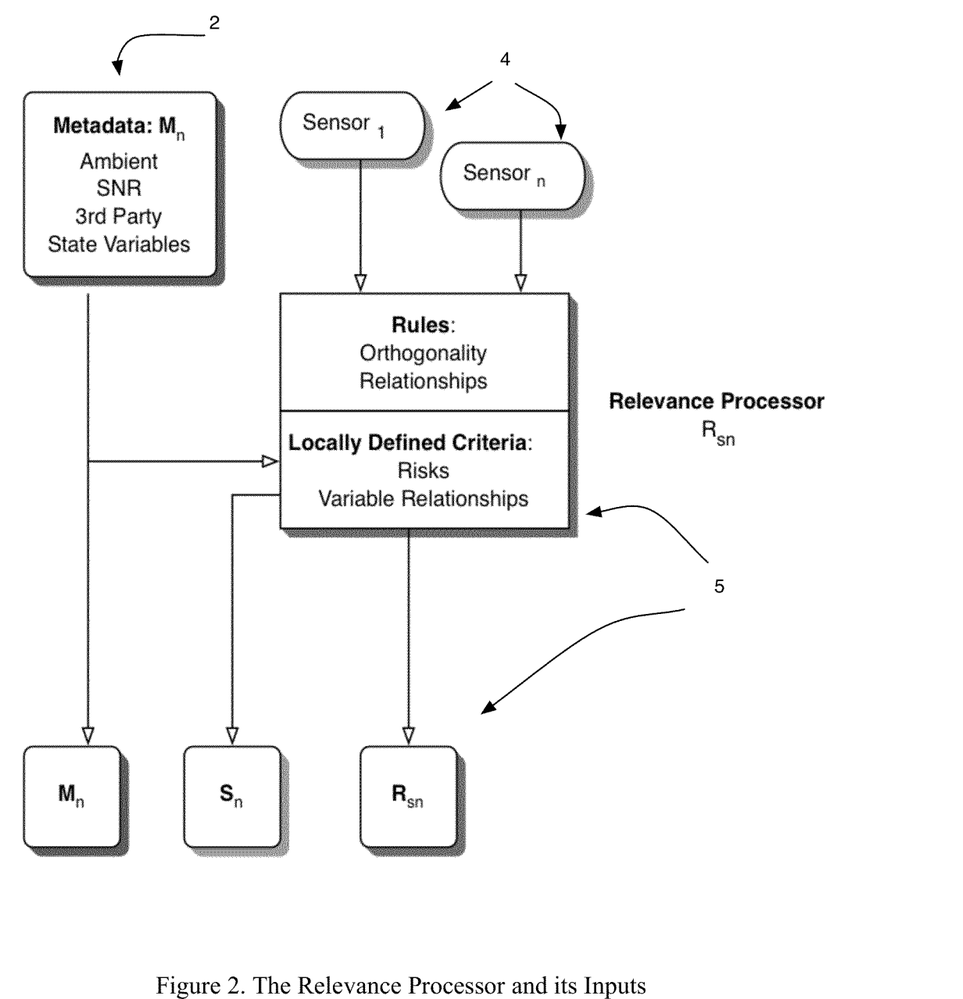
FIG. 2 illustrates a Relevance Processor and its Inputs

The data models are broken down as follows:

Data Variable Model (DVM) 6 or $\partial$: calculation or measurement of application-specific data signatures and impacts for each selected variable from the group of data linearity, repeatability, resolution, sensitivity, specificity, drift, offsets, signal noise and further including performance characteristics and maintenance requirements.

Iterative Forward Modeling (IFM) 7: The combination of all of the DVM variables over time to create iterative models of both the artifact $\partial a$ and normal or elemental $\partial e$ data. Incorporation of the $\partial a$ and $\partial e$ IFM's as delta response signatures that define the probable sensor responses with data computational functions, including the predictive or real time impacts of empirical knowledge or data, combined into a learning model that will define the normal at-sensor response signature.

Figure 3:
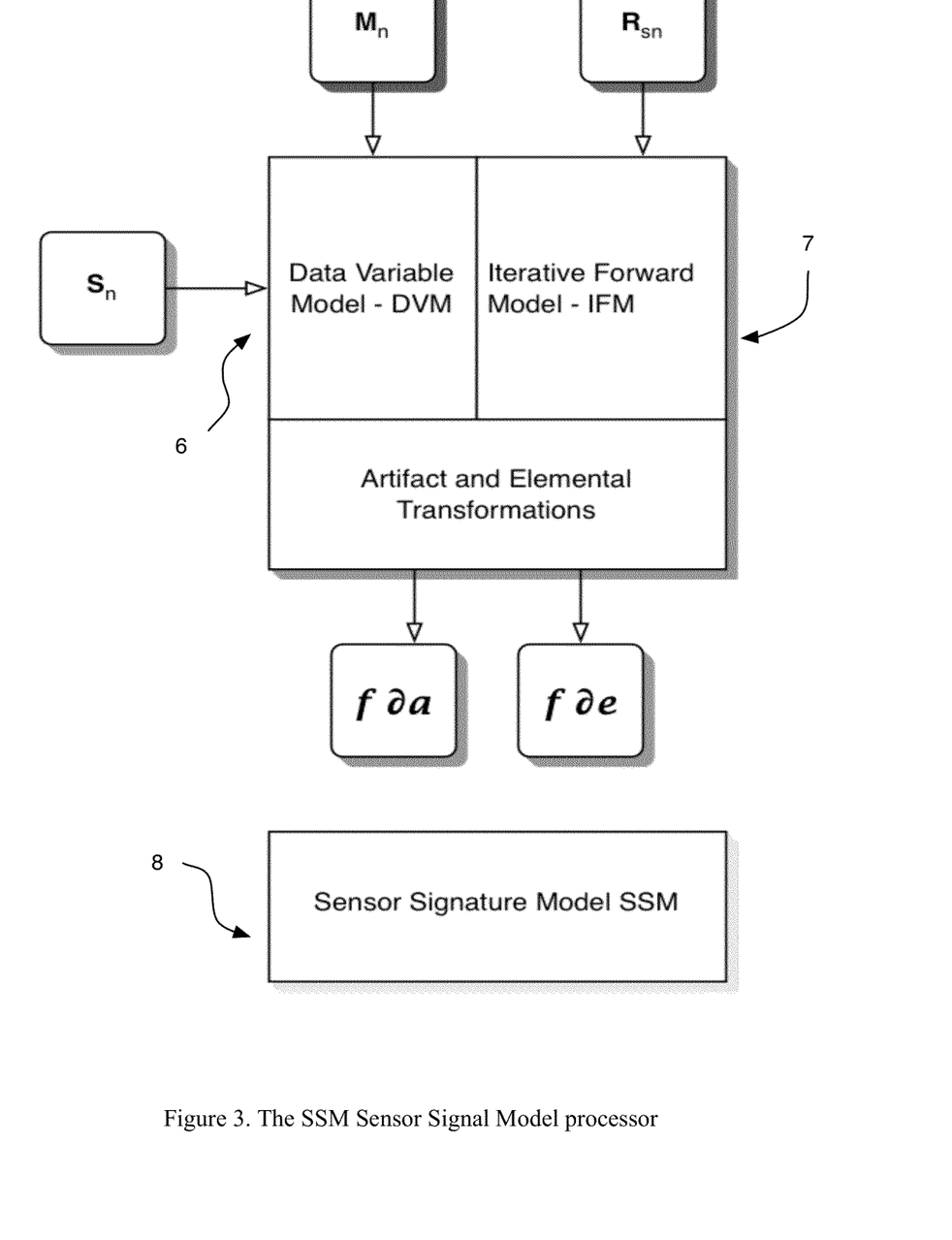
FIG. 3 illustrates a Sensor Signal Model (SSM) processor
Figure 4:
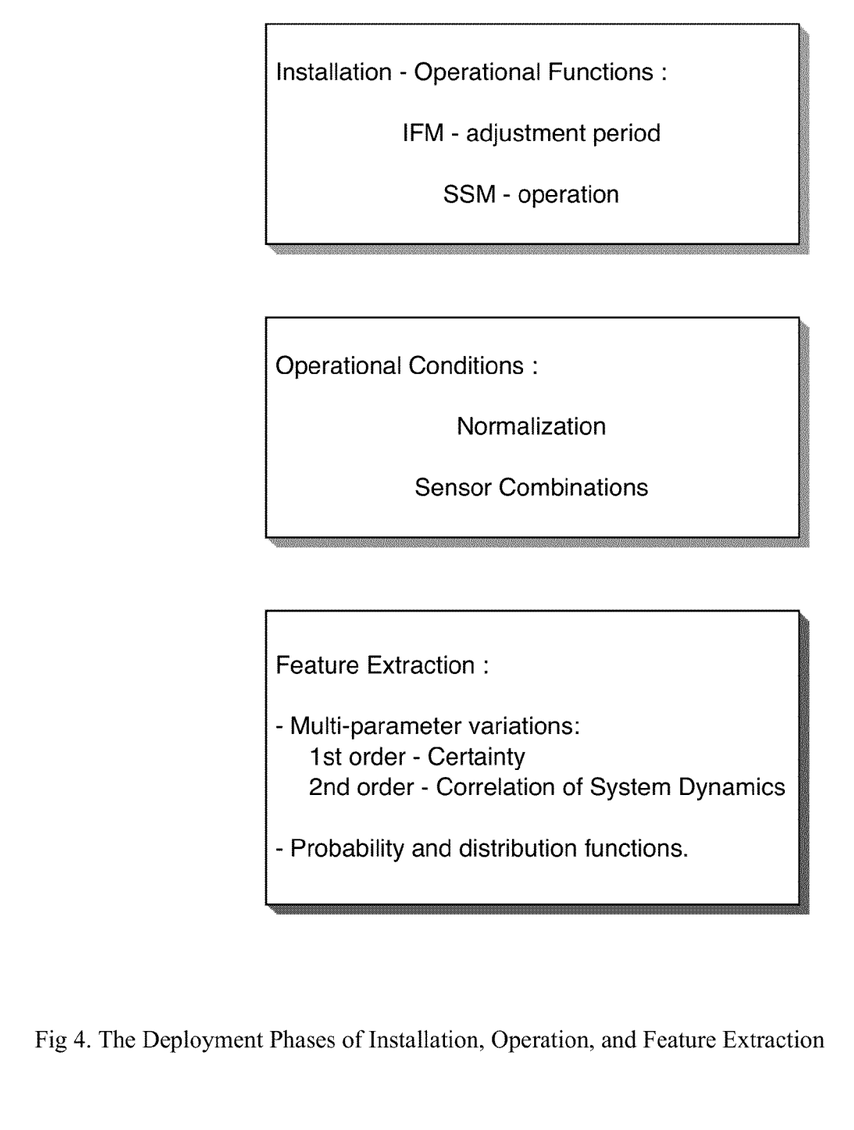
FIG. 4 illustrates the Deployment Phases of Installation, Operation, and Feature Extraction
Figure 5:
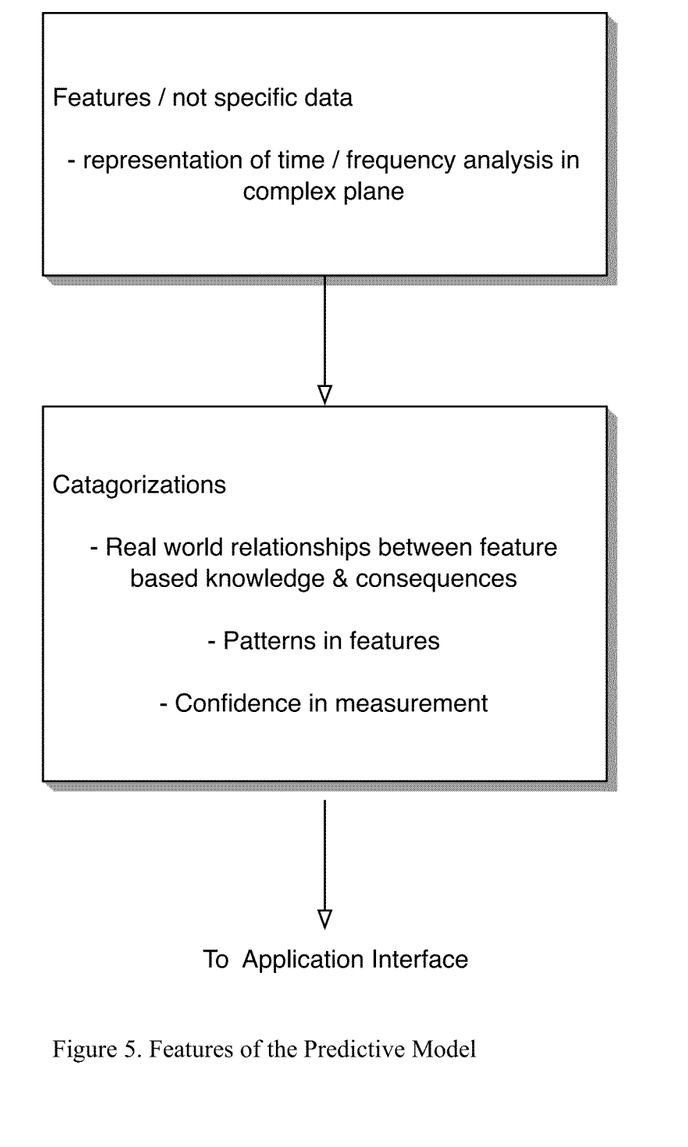
FIG. 5 illustrates the Features of the Predictive Model
Figure 6:
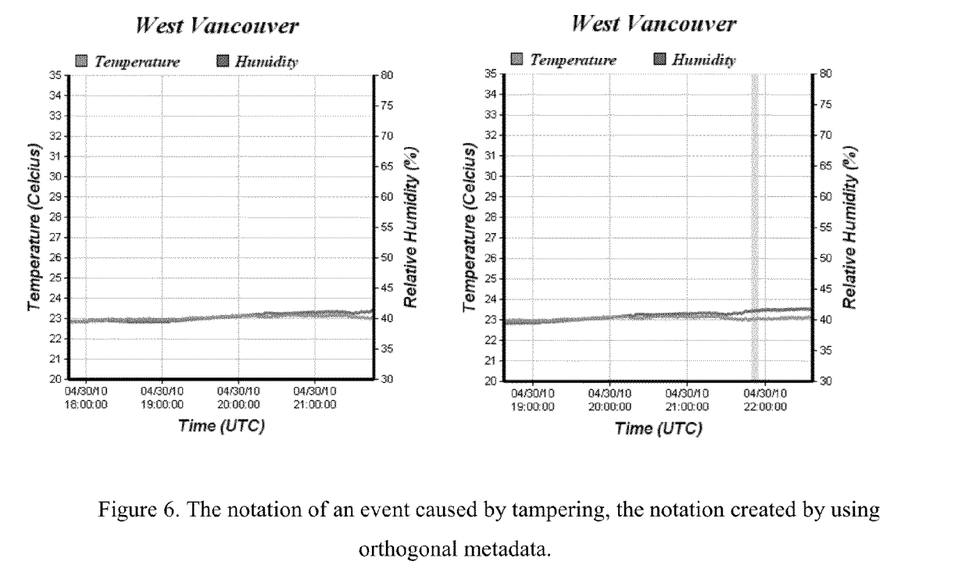
FIG. 6 illustrates the notation of an event caused by tampering, the notation created by using orthogonal metadata.

Sensor Signature Model (SSM) 8: Transformation of at-sensor $\partial a$ and $\partial e$ IFM signatures into two validated functions, $f\partial a$ and $f\partial e$ that together are the SSM. By using the SSM over time the resulting delta response values are directly transformed to baseline normalized and signature balanced values.

While SNR signal to noise ratio have typically been used to describe the values for the definition of sensor performance, the measure of SNR typically falls short of describing the overall systems performance. The Sensor Signature Model (SSM), on the other hand, describes critical variable specific signatures that do not depend entirely on the noise level of a sensor.

Sensor Deployment Phases.

Parameter estimation. The standard operational guidance as noted by system specifications and reporting requirements as required to define the variable for the DVM.

Installation sampling period. Operational conditions, including environmental considerations and normal usage about specific sensor characteristics can be integrated, including the duty cycles, resolution, and sampling intervals. An installation sampling interval will take into account the undefined data of each variable at the DVM definition phase.

IFM adjustment period. The derivation of normalized signatures requires that all application and variable requirements be normalized to specified levels. The approach considers the likely frequency distribution model of each variable and the specified probable range levels minimum, median, maximum per variable, excluding non-significant ranges.

SSM operation. The parameters in the reporting model, the SSM, can now be inferred as the difference between $f\partial a$ and $f\partial e$ parameter and their variations. The relation between the artifact signatures and the normal operation is used to derive minimal, median, and maximal levels based on all the variables per application. A probability distribution is thus more accurately considering all the variables in the model before the reporting of any anomalous event.

Resolution

The resolution of a sensor should be equal to or better than the difference of SSM $f\partial a$ and $f\partial e$ derived signatures.

Normalization of Values.

For interpretation of measured events, people generally wish to have data displayed as dependent upon on a specific absolute reference value, for instance the reporting of water turbidity in NTU. It is often incorrectly assumed that a measured signal is linearly related to the amplitude of an event. Sensors may respond linearly however, artifacts caused by ambient conditions may have impact within the detection bandwidth such as vibration on an optical system or out of band such as temperature on a photodetector and either case may impact sensor detection differently than the quantum efficiency of true signal in a given integration time. The impacts of multiple variables can also impact the accuracy and repeatability of such reporting. For instance with a high sensitivity easily saturated optical sensor, a square root function may be used in the noise normalization if the noise of a sensor were known to increase as the square of the data amplitude. However artifacts can cause substantial increases in sensor response without having any impact on SNR. This is especially the case with variations in ambient conditions that impact the sensor environment and can include variables such as temperature, humidity and vibration.

Evaluation of SNR values might be more reasonably described as their relative variation from the median range signal level rather than an absolute value. Estimated system noise could also be weighted on median response and not on minimum response. Thus if SNR behavior is patterned with signal response, it is the changes from the pattern of what is normal that is weighted and not the actual value of the SNR.

The signature where data response is minimal and SNR and artifacts can have significant impacts are the most critical. A corresponding normalization function would then disregard any sensor response where the impact of $f\partial a$ vs. $f\partial e$ reports a SSM value that is not valid. In this model detectability is given not given by the smallest signal, but rather by the smallest signatures that can be detected and corrected. In this way, data errors are not included in an iterative model of the sensor site.

The signatures of all the variables need to be combined for an overall view of the response requirements. Further definition of what data should be excluded should also be evaluated.

Less value can be derived for sensors where the artifact variables show a significant deviation from normal. The artifact signatures can be interpreted to noise equivalent responses with which impact sensor performance. Furthermore, sensor resolution may vary with the type of artifact and at-sensor data could be normalized before being incorporated in the $f\partial e$ function. This could further prevent skewed data becoming part of the ongoing monitoring and reporting process.

For automation of the calculation that compares the relative signature strength, the maximum, minimum and medians continue to be defined in an ongoing process that excludes of weights differently, data whose SSM signatures reduce the relevance of the data to the problem. The exclusion limits or weighting are an important factor for the combination of heterogeneous data and artifact signatures. The continuous analysis of various data support the iterative process that sets suitable limits to preserves certain data features while excluding non-significant signatures.

Combination Process

The signatures of the sensor variables can be combined for the derivation of corrected data and its associated relevance probability $R_{sn}$, 5. The combination is done based on the values that remain after an exclusion process. Accordingly, insignificant signatures with almost disappearing functions are excluded from further analysis. The derived functions that correlate to critical respective data points are used to normalize the signature to the median level. The median level is a typical response gathered over a period of time where data can be best suited for calibration purposes. Short term impacts such as electromagnetic interference can be compared to calibration and maintenance requirements.

The SSM derived and normalized signatures now need to be combined to report standard scientific measures that are well understood. With variables of low significance excluded to achieve realistic requirements, data that demonstrates that $f\partial a/f\partial e$ within acceptable ratios are included. Determination of this acceptable reporting requirement requires calibrating the monitoring system itself in order to assure that the model is working as the system is given more autonomy to be self correcting.

Dynamic Range.

Minimum, median, and maximum levels are first derived for each application. Furthermore, the minimum and the maximum expected data at a 0% and 100% event are included. The generic minimal, median, and maximal radiance levels are combined from the corresponding application specific values as sensor dependent absolute minimum, generic median, and absolute maximum for all the applications. The median value is taken as the median of all application specific medians, since all applications can be weighted equally only by this kind of combination.

Delta Values at Median

The signatures will smooth the data and act as digital filters to remove noise around the median level, hence, the uncertainty of the final results can be substantially compared with the median case. This allows for cross comparison and even cross calibration in combination with all the variables.

The system contains a model for analysis of variable specific relationships between data and data artifacts. The model can be applied to numerous types of sensors and systems however the focus is to combine low cost ambient sensors that would provide information that would supplement SNR calculations. One object of the invention is to assure that uncertainties be included when translating data into performance or scientific measures.

Uncertainty in itself might be an input as the combination and integration of sensor data results in parameters that do not correlate with the anticipated probabilities. One object of the invention then is to provide an iterative process that allows for sensor data and its variables to be interpreted and adjusted so that data can be managed or corrected in a pre-processing environment, rather than in a post processing, database environment.

Feature Extraction from a Data Stream

In the most common case, the data y is described as variations from a baseline normal over time x. A probability distribution $f(y)$ can describe the variations from normal. However when high frequency variations from normal cease to allow the relationships between the data and the function of what is being measured to support the description of normal, then there is a need to describe the data in other ways, in conjunction with $f(y)$.

Outside of the definition of normal there is a rule based system that describes the state variables including properties such as vibration, position, temperature, humidity, pressure, internal energy, enthalpy, entropy.

Multi Parameter Variations

The relevance of data may also vary with the degree of change over time between periods $\partial = (f(y)/x_n)/(f(y)/x_i)$, however, the relevance may be rule base and interpretive for various scenarios requiring weighting of variables and may be iterative such as part of a self adjusting system.

Multiple variables with multiple weightings and in multiple time scales or lack of linearity in the relevance between changes of data variables point to further requirement for a rule based system.

The data $f(y)$ may be part of a total data acquisition where $y \gg f(y)$ and any relevant data would appear to be buried in signal noise. However the time evolution of a function may be more relevant than the $f(y)/y$ component and the equivalence to momentum in the data over time can be derived from first principles of statistical mechanics using time dependent projection operators and can be described with a Fokker-Plank equation.

The characterization of a zero and first order system can be made in a manner similar to the thermodynamic laws. In the zero order the system is said to be in equilibrium and its properties do not change over time, for instance being characterized as the distribution of events where the data y falls within one standard deviation of the baseline. The first order is the certainty (Cert) by characterization of the system energy as might be interpreted as the systemic noise and the time domain characterization of the data within a certainty of normal. The second order is the (Corr) correlation of system dynamics between systemic noise and reported data.

Multivariate case with various sensors.

When dealing simultaneously with more than one random variable the joint cumulative distribution function can also be defined. For example, for a pair of random variables $Y_1, Y_2$, the joint cumulative distribution function (CDF) is given by:

$$(Y_1, Y_2) \rightarrow f(y_1)/f(y_2) = \text{Probability that } \partial y_1 = f y_2$$

Where every multivariate CDF is:
Monotonically non-decreasing for each of its variables.
Right-continuous for each of its variables.

The third order is the measure of uncertainty and the lack of correlation. $U = \sqrt{Cert^2 + Corr^2}$ Predictive Models and Approximations One objective of the invention is to provide a method for pattern classifications based on groups of measurements and observations in a manner that is not rigid. Classification requires that concepts have to have their logical process defined relative to the application domain and employed in order to define the concepts in terms of rules, restrictions, and properties including Time/Frequency Domain Analysis in the Complex Plane. It is another objective to the invention to apply Classification of data analysis such that the presentation layer is obvious, intuitive and simple. This means presenting data in context with known and relative factors within a use case. The result is to represent knowledge within heterogeneous domains based on reasoning and semantic dependencies rather than strict data relationships. To represent those relationships, hierarchical categorization or equality-relations are applied. A categorization will distinguish between orthogonal and non orthogonal groups data streams and related groups will inherit properties from their superordinates.

To extract knowledge by inferring relationships has real world consequences and must be given a degree of confidence. Such confidence can come from inputs from real world results and as such it is one objective of the invention to apply confidence levels to various results based on their performance over time. For example, two algorithms might be used to represent change in data relationships, one that looks at probabilities over a short term and one over a long term. In order to say we have more knowledge about the reported changes, some real world event must be presented in correlation. For instance, a boiler may have been tampered with and there would be a significant change in accelerometer data followed by a change in the pattern of the data. The short term analysis would be sensitive to the short term tampering but not the change in pattern. The long term analysis would filter out the tampering event but be sensitive to the change in pattern. In this case we have reported both and change in two domains from the same sensor. From a first event some knowledge can be inferred and a pattern can be established for 0 order pattern recognition and confidence assignment.

EXAMPLES

Example 1

A System for monitoring protein levels in air is described that uses multiple sensors throughout a ventilation system. The protein sensor might be a system for spectroscopic analysis, and the ambient metadata sensors would consist of measurements for temperature, vibration, humidity and flow. After a deployment period there would be an apparent pattern between the temperature and humidity and the spectral analysis. Variations in flow or vibration would not have similar correlations. A set of rules would establish the normal relationships and the risks of various health concerns or mechanical concerns with the system.

Example 2

A System for ships ballast monitoring is described where the exchange of ballast from tanks to ocean and vice versa, can be verified using accelerometer and temperature sensors as both the primary and metadata sensors. Sensors would be distributed at critical points through the system and used to measure the difference in temperature and frequency as water passed through the system. Ambient noise would be from mechanical systems on board and from the water hull interface. Monitoring of critical systems such as pumps and valves would further serve to correlate noise from system functions.

Example 3

A visibility monitoring system on a runway is described that uses an optical transmission method to test the forward looking optical density. Metadata sensors including accelerometers, humidity, temperature, barometric pressure, ambient light, electromagnetic interference and optical backscatter are used to measure the conditions in which optical transmission over a range can be normalized.

Example 4

A monitoring system for a potable water well is described that uses a combination of temperature and level sensors to verify the well is suitable for drinking water. Metadata sensors including rain data, temperature and ultrasonic density are used to verify that the well is not at risk of contamination. Other metadata sensors such as optical scatter can be used to verify well measurement parameters. It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

We claim:

1. A system for data error correction comprising primary sensors deployed in an environment, with one or more supplementary sensors for ambient data whose output as a form of metadata with a reference time code can characterize performance conditions utilizing background ambient conditions where a metadata pattern reference would subsequently be representative as a look up table in a relational database or reference algorithm in a semantic network system and where metadata is collected from the one or more supplementary sensors, the one or more supplementary sensors selected from the group consisting of an accelerometer, a temperature sensor, humidity sensor, atmospheric pressure sensor, fluid flow sensor, a fluid condition sensor, ultrasound, an electromechanical transducer, piezo electric crystal, linear actuator or optical position measurement sensor and where a format or sequence of processes is a basis for a mathematical model to establish a logical weighting to performance data, and where multiple sensor variables can be combined to derive such logical weighting and would include variations considered orthogonal to a particular primary sensor such that a change in primary sensor output can be correlated to changes in supplementary sensor output such that the one or more secondary sensors can be used to correct or assign a performance value to the data from the particular primary sensor.

* * * * *